Jan. 15, 1963  J. T. SALIHI  3,074,000

VOLTAGE REGULATOR

Filed Sept. 26, 1958  3 Sheets-Sheet 1

INVENTOR.
JALAL T. SALIHI
BY
John W. Ralls
ATTORNEY

Jan. 15, 1963   J. T. SALIHI   3,074,000
VOLTAGE REGULATOR
Filed Sept. 26, 1958   3 Sheets-Sheet 2

INVENTOR.
JALAL T. SALIHI
BY John W. T. Ralls
ATTORNEY

Jan. 15, 1963

J. T. SALIHI 3,074,000

VOLTAGE REGULATOR

Filed Sept. 26, 1958

INVENTOR.
JALAL T. SALIHI
BY
ATTORNEY

United States Patent Office 3,074,000
Patented Jan. 15, 1963

3,074,000
VOLTAGE REGULATOR
Jalal T. Salihi, San Carlos, Calif., assignor to Lenkurt Electric Co., Inc., San Carlos, Calif., a corporation of Delaware
Filed Sept. 26, 1958, Ser. No. 763,701
1 Claim. (Cl. 321—16)

This invention provides improved, voltage-regulating circuits that are especially well suited for compact, regulated power supplies employing switching transistors, such as transistorized inverter-rectifier combinations operating from an unregulated D.C. source to provide one or more regulated D.C. outputs. Exceptionally compact, efficient power supplies are realized which can handle large amounts of power—amounts limited only by the capabilities of available transistors.

According to the invention, the A.C. output of the inverter in an inverter-rectifier combination, or the like, has the form of essentially rectangular-waveform voltage pulses; and good regulation is achieved by automatic control of the duty cycle of the A.C. output, so that a constant D.C. voltage is obtained after rectification of pulses. More specifically, a pair of switching devices— e.g., switching transistors—are operated alternately to their high-conductivity state for saturating the core of a saturable-core transformer in opposite polarities alternately. This provides, in a transformer secondary, voltage pulses having a constant product of amplitude times duration, so that rectification of the pulses provides a D.C. voltage having a magnitude that is directly proportional to the pulse repetition rate or frequency. The switching frequency of the aforesaid switching devices (which is identical to the output pulse frequency) is controlled, as explained, to provide an output voltage of the desired constant value. Preferably, the pulses obtained directly from the saturable-core transformer secondary are not used as the inverter output, but are employed to control two other switching transistors connected to the primary of a nonsaturating transformer, which has one or more secondaries for supplying the A.C. output of the inverter to one or more rectifiers.

The invention may be understood more completely from the following illustrative description and the accompanying drawings.

FIG. 1 of the drawings is a circuit diagram of an oscillator-controller-inverter combination embodying principles of this invention;

Figure 1:
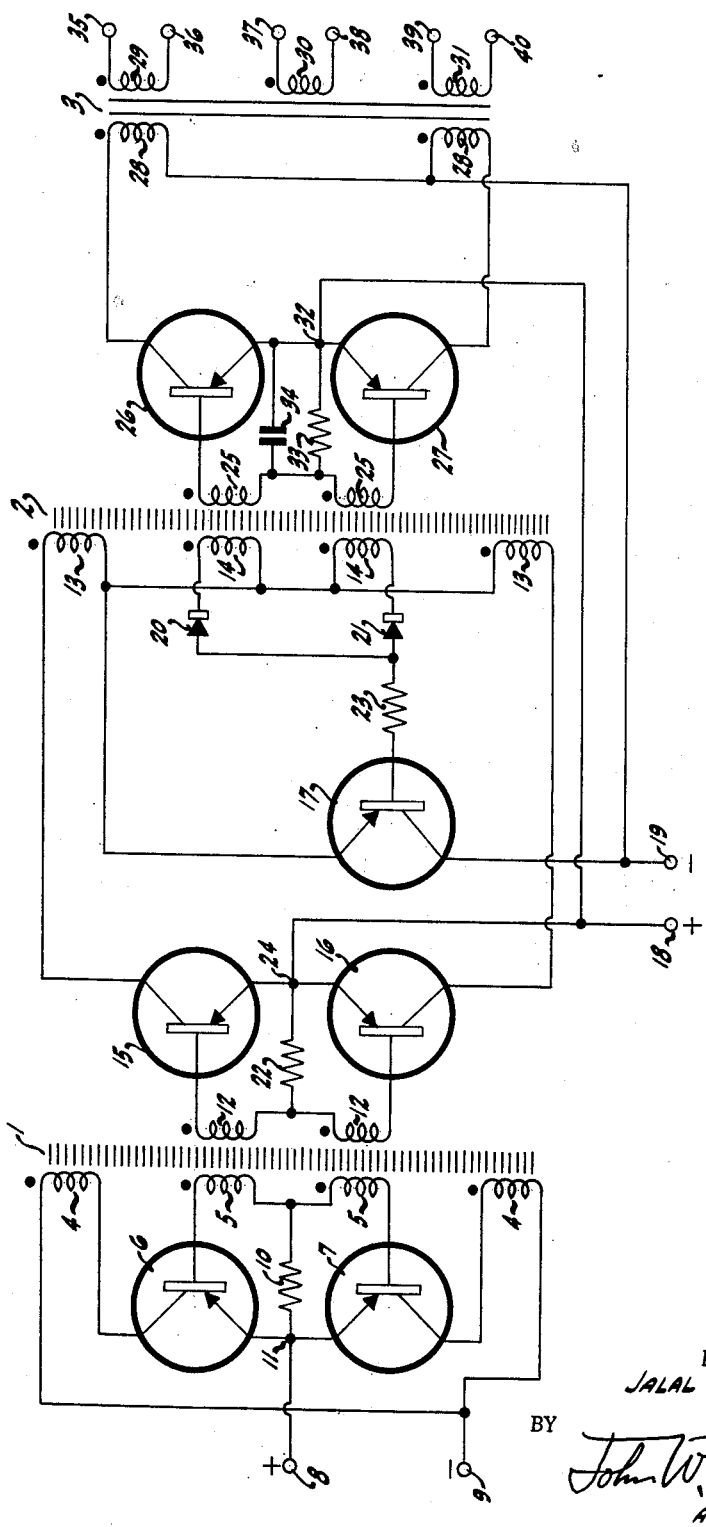

With particular reference to FIG. 1, saturable-core transformers are represented at 1 and 2, and a nonsaturating transformer is represented at 3. Dots have been placed adjacent to winding terminals of like polarity, in accordance with a well-known convention.

At the left in FIG. 1, there is shown an oscillator of the type described by G. H. Royer in AIEE Transactions, vol. 74, part I, pages 322-327, 1955, sometimes called a Royer oscillator. Briefly stated, the Royer oscillator comprises a primary 4 and a secondary 5 of transformer 1, two switching transistors 6 and 7, two terminals 8 and 9, and a resistor 10, all connected together as shown. Of course it is immaterial whether the primary and secondary each consists of a single center-tapped winding, or each consists of two windings connected together in series as shown. For simplicity and clearness, the term "center terminal" is herein used to identify the electrical equivalent of a center tap. Each transistor comprises an emitter, a base, and a collector, as indicated by the conventional symbols employed in the drawings. It will be noted that the transistors 6 and 7 are connected in series opposition between the two end terminals of primary 4: the collector of transistor 6 is connected to one end terminal of the primary; the collector of transistor 7 is connected to the other end terminal of the primary; and the two emitters are connected together at a circuit junction 11. The bases of the two transistors are connected to different end terminals of secondary 5, and resistor 10 is connected between junction 11 and the center terminal of secondary 5. Terminal 8 is connected to junction 11, and terminal 9 is connected to the center terminal of primary 4.

When a voltage is applied between terminals 8 and 9, and thus between junction 11 and the center terminal of primary 4, one or the other of transistors 6 and 7 becomes highly conductive, and substantially the entire applied voltage appears across one half of primary 4. The resulting change of magnetization in the transformer core induces voltages in secondary 5 that keep the conductive transistor in a high-conductivity state, and keep the other transistor in a low-conductivity state. The magnetic flux in the core increases linearly with time until the core saturates, whereupon the induced voltages vanish suddenly, which results in a change of state in both transistors: that is, the transistor that was previously in the high-conductivity state is suddenly switched to the low-conductivity state; and the transistor that was previously in the low-conductivity state is suddenly switched to the high-conductivity state. Substantially the entire voltage applied between terminals 8 and 9 now appears across the other half of the transformer primary, and the core is driven to saturation in the opposite magnetic polarity. Thus, transistors 6 and 7 are switched to the high-conductivity state alternately, and the circuit oscillates at a frequency proportional to the voltage applied between terminals 8 and 9, as is more fully described in the article by Royer identified above.

Hence, by applying an adjustable control voltage bebetween terminals 8 and 9, as hereinafter explained, the frequency of oscillation can be adjusted. The oscillator output is conveniently taken from another secondary 12 of transformer 1, where the A.C. output of the oscillator appears as rectangular-waveform voltage pulses of positive and negative polarity alternately.

At the center in FIG. 1, there is shown a control circuit which links the Royer oscillator to a switching-transistor inverter. This control circuit comprises a primary 13 and a secondary 14 of transformer 2, three switching transistors 15, 16 and 17, two terminals 18 and 19, two diode rectifiers 20 and 21, and two resistors 22 and 23, all connected together and connected to the output terminals of the Royer oscillator, as shown. It will be noted that transistors 15 and 16 are connected in series opposition between the two end terminals of primary 13: that is, the collectors of transistors 15 and 16 are connected to different end terminals of primary 13, and the emitters of transistors 15 and 16 are connected together at a circuit junction 24. The bases of transistors 15 and 16 are connected to different end terminals of secondary 12, resistor 22 is connected between the center terminal of secondary 12 and junction 24, and terminal 18 is connected to junction 24. Transistor 17 is connected in series between the center terminal of primary 13 and terminal 19; that is, the emitter of transistor 17 is connected to the center terminal of primary 13; and the collector of transistor 17 is connected to terminal 19. Thus, transistor 17 constitutes circuit means connecting terminal 19 to the center terminal of primary 13; and whenever transistor 17 is in the high-conductivity state any voltage applied between terminals 18 and 19 is thereby applied between junction 24 and the center terminal of primary 13.

In operation, the unregulated supply voltage is applied between terminals 18 and 19, and thus between junction 24 and the center terminal of primary 13, as is hereinafter more fully explained. Transistors 15 and 16 in alternation are switched to the high-conductivity state by the alternating voltages of opposite polarity supplied to their bases by the Royer oscillator. Assume that transistor 15 is in the high-conductivity state. Substantially the entire unregulated supply voltage now appears across the upper half of primary 13, and the core of transformer 2 is driven to saturation in one polarity. However, switching of transistors 15 and 16 is controlled by the Royer oscillator and not by saturation in transformer 2; therefore, transistor 15 remains in the high-conductivity state for a brief interval after the core of transformer 2 has saturated. During the next half-cycle of the oscillator output, transistor 16 is switched to the high-conductivity state, and the supply voltage applied between terminals 18 and 19 appears across the lower half of primary 13. Now the core of transformer 2 is driven to saturation in the opposite polarity, and the core of transformer 2 remains saturated for a brief interval before the Royer oscillator again transposes the conduction states of the two switching transistors 15 and 16.

Upon saturation of the core of transformer 2, the induced voltages in the transformer windings disappear and the current through primary 13 is limited only by circuit resistance and the conductivity of the transistors. One or the other of transistors 15 and 16 is always in the high-conductivity state, and consequently excessive current might flow through primary 13 (causing at least a power waste and perhaps other difficulties) if means were not provided to prevent such occurrences. This means is transistor 17, which is automatically switched to a low-conductivity state as soon as transformer 2 saturates. This is accomplished by connecting the base of transistor 17 through resistor 23 and diode rectifiers 20 and 21 to secondary 14, in the manner illustrated. While the magnetic flux in the core of transformer 2 in changing, in either direction, a voltage from secondary 14 is transmitted through one or the other of rectifiers 20 and 21 to the emitter-base circuit of transistor 17, and the two rectifiers are so poled that this voltage is always of the proper polarity for driving transistor 17 to the high-conductivity state. Thus, transistor 17 provides a low-impedance connection between terminal 19 and the center terminal of primary 13 while the magnetic flux in transformer 2 is changing. However, as soon as the core of transformer 2 saturates, the voltages induced in secondary 14 disappear and transistor 17 is thereby automatically switched back to a low-conductivity state. In effect, this substantially opens the circuit between terminal 19 and the center terminal of primary 13 while the transformer core is saturated, and thus prevents the flow of excessive current through primary 13 and the transistors connected thereto.

From the foregoing, it is apparent that the unregulated D.C. supply voltage is applied across the two halves of primary 13 alternately, saturating the core of transformer 2 in opposite polarities alternately, at a frequency controlled by a control voltage applied between the terminals 8 and 9 of the Royer oscilllator. Hence, the voltages induced in each winding of the transformer 2 have the form of essentially rectangular-waveform voltage pulses, of positive and negative polarity alternately, separated by brief intervals of essentially zero induced voltage while the core of transformer 2 is saturated. The amplitude of the induced voltage pulses is directly proportional to the supply voltage applied between terminals 18 and 19; but the product of the pulse amplitude times the pulse duration is a constant which depends only upon the number of turns in the transformer winding, the core size, and the saturating characteristics of the core material. Consequently, the duration of each pulse is inversely proportional to the unregulated supply voltage; and the duty cycle of the A.C. output of the control circuit is a function of the supply voltage applied between terminals 18 and 19 and the control voltage applied between terminals 8 and 9, jointly. The A.C. output of the control circuit is preferably taken from another secondary 25 provided on transformer 2.

Although the voltages induced in the windings of transformer 2 have the waveform desired for the A.C. output of the inverter, it may be undesirable to require that full output power be handled by the saturable-core transformer. For this reason, the voltages induced in secondary 25 are not directly used as a power-supply output, but are used to control a pair of switching transistors 26 and 27 in an inverter circuit compromising the nonsaturated transformer 3. As shown, transformer 3 has a primary 28 and any desired number of secondaries, such as the three secondaries 29, 30 and 31 illustrated. Switching transistors 26 and 27 are connected in series opposition between the two end terminals of primary 28: that is, the collectors of transistors 26 and 27 are connected to different end terminals of primary 28; and the emitters of transistors 26 and 27 are connected together at a circuit junction 32. The unregulated D.C. supply voltage is applied between junction 32 and the center terminal of primary 28 by connections to terminals 18 and 19, as shown. The bases of transistors 26 and 27 are connected to different end terminals of secondary 25, and the center terminal of secondary 25 is connected to junction 32 through a resistor 33 and a capacitor 34 connected in parallel, as shown.

The voltage drop across resistor 33 biases both of the transistors 26 and 27 toward the low-conductivity state, so that neither of these two transistors conducts appreciable current while the core of transformer 2 is saturated. However, the voltage pulses of alternating polarity induced in secondary 25, as hereinbefore explained, switch transistors 26 and 27 alternately to the high-conductivity state, so that the unregulated supply voltage applied between terminals 18 and 19 appears across the two halves of primary 28 alternately; and rectangular-waveform voltage pulses, of positive and negative polarity alternately, are induced in each of the secondary windings 29, 30 and 31. The amplitudes of these pulses are proportional to the supply voltage applied between terminals 18 and 19; and their durations are the same as the durations of the voltage pulses induced in the windings of transformer 2. Hence, the pulses induced in each of the secondaries, 29, 30, and 31 have a substantially constant (for that secondary, but not necessarily the same constant for a different secondary) product of pulse amplitude times pulse duration. The inverter output terminals, connected to respective ones of secondaries 29, 30 and 31, as shown, are identified in the drawing by reference numbers 35 through 40, inclusive. The A.C. output from each secondary may be rectified for supplying a regulated D.C. voltage to a load, as hereinafter explained, or used for any other desired purpose.

Figure 2:
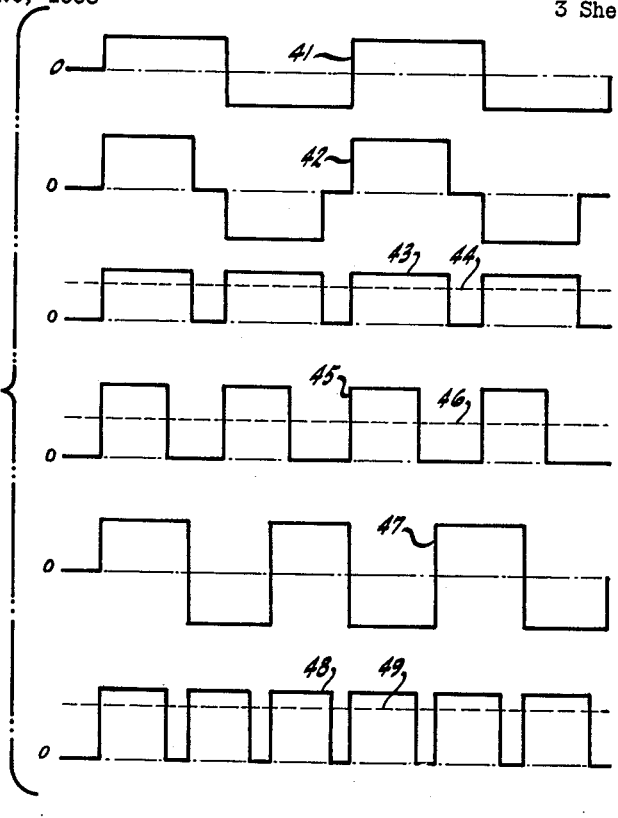
FIG. 2 is a group of curves that will be used in explaining the operation of the circuit illustrated in FIG. 1.

Operation of the circuit shown in FIG. 1 may be more fully understood by reference to the curves shown in FIG. 2. Curve 41 represents the A.C. output of the Royer oscillator, obtained across secondary 12 of transformer 1. It will be seen that this output voltage consists of essentially rectangular-waveform voltage pulses, of positive and negative polarity alternately. The pulse rate or frequency of these pulses is proportional to the control voltage applied between terminals 8 and 9. Curve 42 illustrates the waveform of the voltage induced in secondary 25 of transformer 2, which is essentially the same as the waveform of the voltages induced in each secondary 29, 30 and 31 of transformer 3. It will be noted that this waveform consists of essentially rectangular-waveform voltage pulses, of positive and negative polarity alternately, in which the pulses are separated by brief intervals of essentially zero induced voltage while the core of transformer 2 is saturated. The pulse rate or frequency of the waveform illustrated by curve 42 is identical to the pulse rate or frequency of the waveform 41 representing the output of the Royer oscillator. In curve 42, the pulse height is proportional to the unregulated supply voltage applied between terminals 18 and 19, and the area covered by each pulse—the product of the pulse amplitude times the pulse duration—is a constant determined by the saturating characteristics of transformer 2. In other words, if the supply voltage increases, the pulse amplitude increases proportionately, but the larger voltages supplied to primary 13 cause more rapid changes in the flux within the core of transformer 2, so that the transformer core is driven from saturation in one polarity to saturation in the other polarity in less time and the pulse duration decreases in inverse ratio to the increase in pulse amplitude. Curve 43 represents the voltage waveform obtained by full-wave rectification of the pulses represented by curve 42; and broken line 44 represents the D.C. component of the rectified voltage, which may be separated from the A.C. component by a conventional filter.

Curve 45 is similar to curve 43, except that the pulses have a larger amplitude and a shorter duration, which is the result of an increase in the unregulated supply voltage. However, for reasons hereinbefore explained, it will be noted that the area covered by each pulse of waveform 45 is the same as the area covered by each pulse of waveform 43, since the product of the pulse amplitude times the pulse duration is a constant determined by the characteristics of transformer 2. Broken line 46 represents the D.C. component of waveform 45. It should be noted that the two D.C. components represented by lines 44 and 46 have equal values.

Curve 47 represents the A.C. output of the Royer oscillator, obtained across secondary 12 of transformer 1, after an increase in the control voltage applied between terminals 8 and 9. By comparing curve 47 with curve 41, it can be noted that the amplitude of the voltage pulses has increased in proportion to the increased control voltage, and that the pulse rate or frequency has increased in like proportion. Since the Royer oscillator controls the switching frequencies of the whole circuit, the rectified output of the inverter, taken from a rectifier connected to any of the windings 29, 30 and 31, likewise has a higher pulse rate or frequency, as represented by curve 48. Broken line 49 represents the D.C. component of waveform 48. It should be noted that each pulse of waveform 48 covers the same area as each pulse of waveforms 43 and 45, since the product of pulse amplitude times pulse width remains constant, but the D.C. component represented by line 49 is larger than the D.C. component represented by lines 44 and 46 in proportion to the increase in pulse rate or frequency.

According to the foregoing explanation, the application of a constant control voltage between terminals 8 and 9 should produce a constant switching frequency under all normal conditions of operation, and a constant voltage should be obtained by rectifying and filtering the voltage induced in any one of the windings 29, 30 and 31. This is approximately true, but where precise regulation is required compensation must be provided for certain disturbing factors that were neglected in the simplified explanation. One of these factors is change in the characteristics of the saturable-core transformer with changes in temperature, which affects the value of the "constant" obtained by taking the product of pulse amplitude times the pulse duration. However, this effect is easily compensated by making the cores of saturable-core transformers 1 and 2 of the same material, so any change in the saturating characteristics of one core are accompanied by a like change in the saturating characteristics of the other core. Then, if the duration of the output pulses decreases solely because of a change in the magnetic characteristics of the core of transformer 2, the same change in the magnetic characteristics of the core of transformer 1 will increase the pulse rate or frequency of the Royer oscillator output, so that the duty cycle of the ultimate A.C. output remains the same and therefore the D.C. component of the rectified output remains constant in value.

Another factor that must be considered is variation in the voltage drops across the conductive transistors with variations in the unregulated supply voltage. This can result in an output-voltage versus supply-voltage curve that slopes either upward or downward slightly, depending upon transistor characteristics. To compensate for this, the control voltage applied between terminals 8 and 9 can be varied automatically by a small amount responsive to variations in the unregulated supply voltage. A circuit for accomplishing this is illustrated in FIG. 3.

Figure 3:
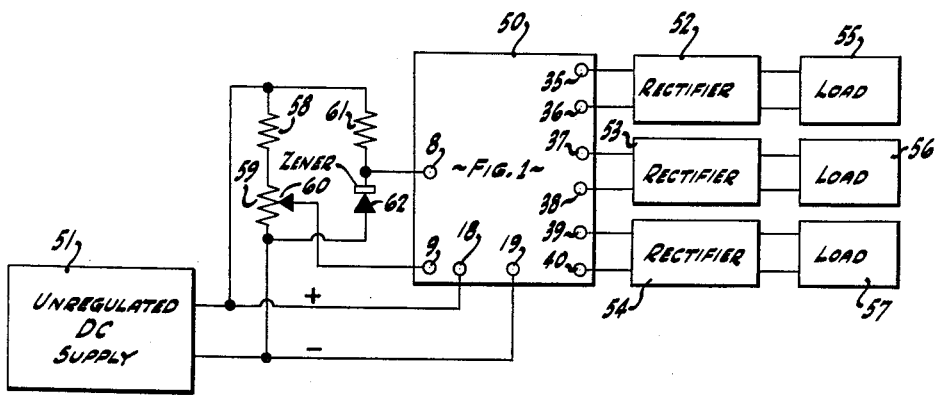
FIG. 3 is a schematic and block diagram illustrating open-loop operation of the novel voltage regulator.

In FIG. 3, the complete circuit shown in FIG. 1 is represented by block 50. An unregulated D.C. supply 51 is connected to terminals 18 and 19, and the three A.C. outputs from the inverter are connected to three rectifiers 52, 53 and 54 which supply regulated D.C. voltages to three loads 55, 56 and 57. The circuit for applying the control voltage between terminals 8 and 9 will now be described.

Figure 4:
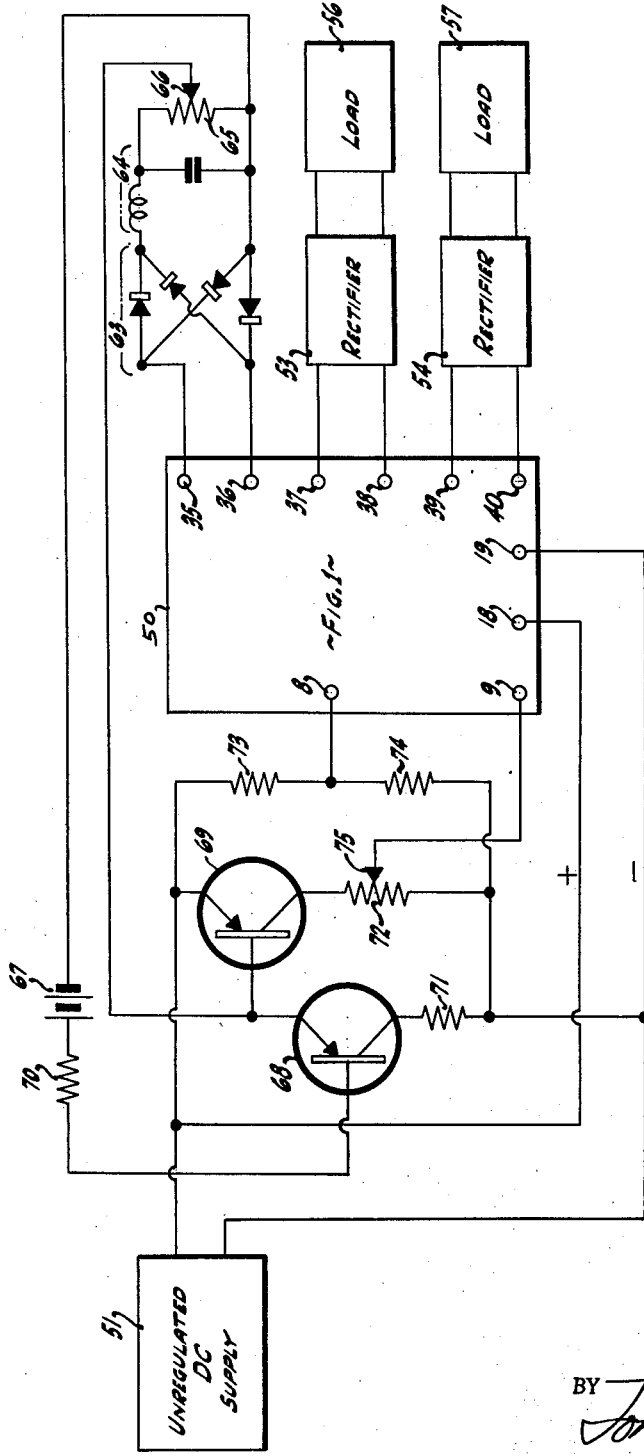
FIG. 4 is a schematic and block diagram illustrating closed-loop operation of the novel voltage regulator.

A voltage divider, consisting of resistors 58 and 59, is connected across the unregulated D.C. supply 51, as shown. Resistor 59 is provided with an adjustable tap 60 connected to terminal 9. Another voltage divider, also connected across the unregulated D.C. supply, consists of a resistor 61 in series with a Zener diode 62. This voltage divider has its fixed tap connected to terminal 8. Since the voltage drop across a Zener diode is substantially constant, a substantially constant basic control voltage is provided. Subtracted from this basic voltage is a voltage component proportional to the unregulated supply voltage. Thus, the control voltage supplied between terminals 8 and 9 comprises a fixed component which does not vary appreciably with variations in the supply voltage, and a variable component which does vary with variations in the supply voltage. The magnitude of the variable component can be adjusted by adjusting tap 60, and this adjustment can be made to level the output-voltage versus supply-voltage curve, so that substantially constant D.C. voltages are supplied to each of the three loads 55, 56 and 57, irrespective of variations in the voltage provided by unregulated D.C. supply voltage 51.

Where even more precise regulation is required, a closed-loop control system may be employed, as is illustrated in FIG. 4. With particular reference to FIG. 4, parts that are identical to corresponding parts of FIG. 3 bear the same reference numbers. The chief difference between the two figures is in the circuit for applying a control voltage between terminals 8 and 9. In FIG. 4, one of the A.C. outputs from the inverter is rectified by a full-wave rectifier network 63 and filtered by a conventional filter 64 to provide a D.C. voltage across a load resistor 65. Since the D.C. voltages supplied to loads 56 and 57 are proportional to the D.C. voltage across resistor 65, it is evident that very precise regulation of the output voltages can be provided by using a feedback loop to maintain the voltage across resistor 65 constant.

An adjustable tap 66 is provided for taking off any desired portion of the voltage across resistor 65. This is automatically compared with the voltage provided by a standard battery 67, or the like, by connecting the two voltages to be compared in series opposition so that their sum is an error voltage. The error voltage is amplified by a direct-coupled amplifier, the output of which supplies control voltage to terminals 8 and 9. For example, there is shown in FIG. 5 a two-stage amplifier comprising two transistors 68 and 69, and five resistors, 70 through 74 inclusive, connected as shown. Resistor 72 is provided with an adjustable tap 75 connected to terminal 9 so that adjustment of tap 75, in a manner similar to adjustment of tap 60 in the FIG. 3 circuit, can be made to compensate approximately for variations in output voltage due to variations in the supply voltage. Any remaining variations in the output voltage are minimized by amplification of the error signal to change the control voltage applied between terminals 8 and 9 in the sense necessary for correcting the undesired deviation. Thus, if the voltage across resistor 65 becomes slightly larger than normal, tap 66 becomes more positive and the conductivity of transistor 68 increases. This increases the base current of transistor 69 which in turn increases the collector current of transistor 69 and makes tap 75 more positive. Thus, the control voltage applied between terminals 8 and 9 is reduced, which reduces the output frequency of the Royer oscillator and thus reduces the switching frequency of the entire circuit illustrated in FIG. 1, which in turn reduces the D.C. output voltage, as hereinbefore explained, and minimizes the undesired deviation.

In its broader aspects, this invention is not limited to specific examples illustrated and described. What is claimed is this:

In a voltage regulator, the combination of two saturable-core transformers each having three windings, the three windings of one transformer being here designated the first, second and third windings, and the three windings of the other transformer being here designated the fourth, fifth and sixth windings, each of said windings having two end terminals and a center terminal, five transistors each having an emitter, a base and a collector, the five transistors being here designated the first, second, third, fourth and fifth transistors, said first and second transistors having their emitters connected together, their collectors connected to different ones of the two end terminals of said first winding, and their bases connected to different ones of the two end terminals of said second winding, a resistor connected between the center terminal of said second winding and the emitters of said first and second transistors, connections for applying a control voltage between the center terminal of said first winding and the emitters of said first and second transistors, whereby said first and second transistors conduct current alternately, saturating the core of said one transformer, in opposite polarities alternately, at a switching frequency directly proportional to the magnitude of said control voltage, said third and fourth transistors having their emitters connected together, their bases connected to different ones of the two end terminals of said third winding, and their collectors connected to different ones of the two end terminals of said fourth winding, a resistor connected to the center terminal of said third winding and the emitters of said third and fourth transistors, the center terminals of said fourth and fifth windings being connected together and to the emitter of said fifth transistor, a resistor connected in series with the base of said fifth transistor, two diode rectifiers connected between the last-mentioned resistor and different ones of the two end terminals of said fifth winding, said rectifiers being poled to decrease the conductivity of the fifth transistor whenever the core of said other transformer is saturated, and circuit connections for applying an unregulated supply voltage between the collector of said fifth transistor and the emitters of said third and fourth transistors, whereby said third and fourth transistors conduct current alternately at the aforesaid switching frequency, saturating the core of said other transformer in opposite polarities alternately, so that rectangular waveform voltage pulses of alternately positive and negative polarity are induced in said sixth winding, the last-mentioned pulses having durations inversely proportional to the magnitude of said supply voltage.

References Cited in the file of this patent

UNITED STATES PATENTS

| | | |
|---|---|---|
| 2,783,380 | Bonn | Feb. 26, 1957 |
| 2,783,384 | Bright et al. | Feb. 26, 1957 |
| 2,809,303 | Collins | Oct. 8, 1957 |
| 2,875,351 | Collins | Feb. 24, 1959 |
| 2,950,446 | Humez et al. | Aug. 23, 1960 |
| 2,959,725 | Younkin | Nov. 8, 1960 |
| 2,959,745 | Grieg | Nov. 8, 1960 |
| 2,968,738 | Pintell | Jan. 17, 1961 |